Feb. 29, 1944.  A. S. BRUNJES  2,342,838
RECOVERY OF HALOGENATED AROMATIC COMPOUNDS
Filed June 22, 1942
Fig.1.
Fig.2.
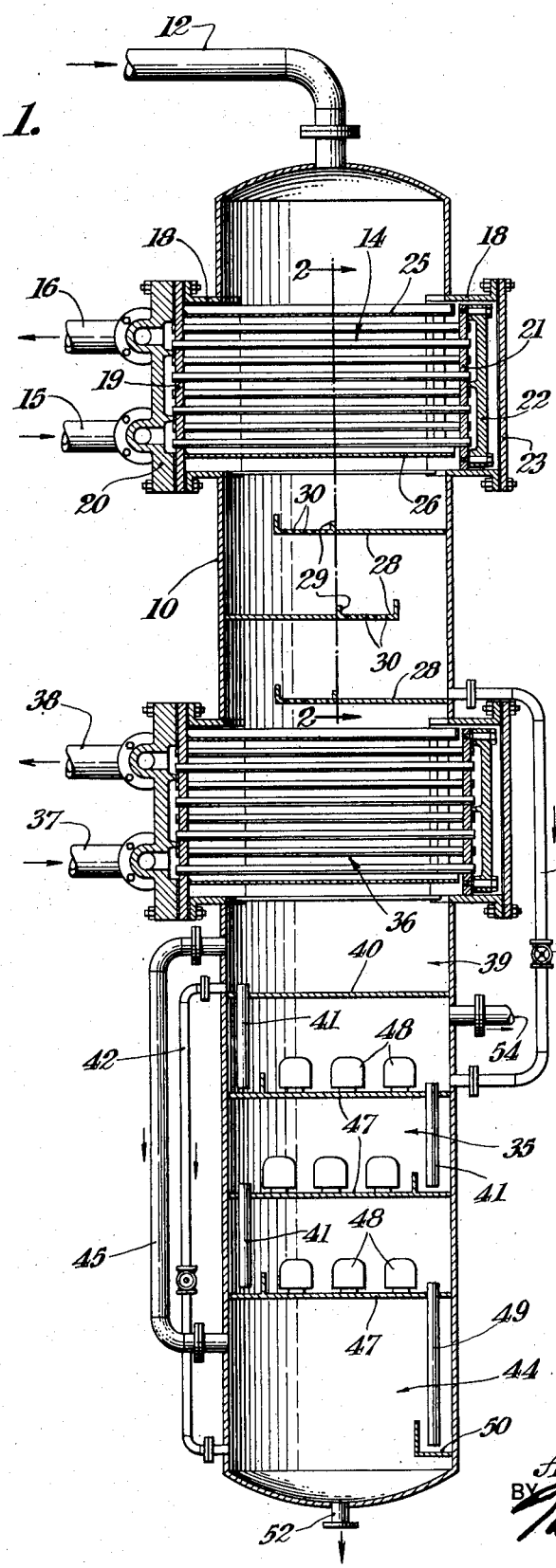
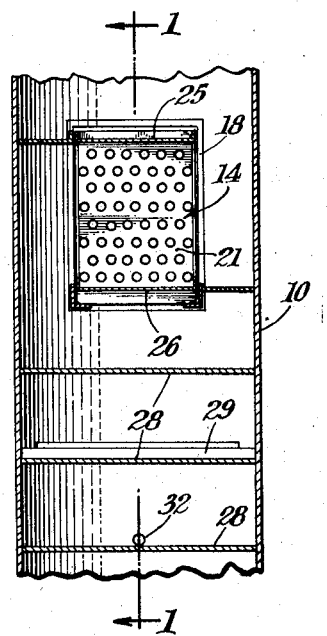
INVENTOR
Austin S. Brunjes
BY
ATTORNEY Patented Feb. 29, 1944

2,342,838

UNITED STATES PATENT OFFICE 2,342,838

RECOVERY OF HALOGENATED AROMATIC COMPOUNDS

Austin S. Brunjes, Plandome, N. Y., assignor to The Lummus Company, New York, N. Y., a corporation of Delaware Application June 22, 1942, Serial No. 447,981

12 Claims. (Cl. 62—175.5)

This invention relates to improvements in the separation of vapor mixtures and more particularly relates to the separation of halogen from halogenated aromatic compounds as in the manufacture of chlorobenzene.

In connection with the present emergency, it has been necessary to produce substantially large quantitites of industrial-products from available raw materials, and every effort is being made to obtain most economical yields of the desired end products with a full recovery of the associated material. More particularly, in the production of phenol, it has been found desirable to produce chlorobenzene by the chlorination of benzene with a resulting mixture consisting of chlorine, hydrogen chloride, benzene, and chlorobenzene and polychlorobenzenes. It is to be appreciated that it is necessary to remove the hydrogen chloride from the halogenated hydrocarbons not only to produce the desired useful halogenated hydrocarbons but also to produce a commercial hydrogen chloride which can be suitably absorbed to produce a commercial hydrochloric acid.

The boiling points of the respective components of this mixture are relatively far apart, and I have found that it is possible to condense out the respective liquefiable materials and to remove the hydrogen chloride as a gas. Such operation, however, depends upon a highly accurate temperautre control and the provision of suitable apparatus having the necessary flexibility for variations in operating conditions.

The principal object of my invention is to provide an improved method of separating halogenated hydrocarbon materials from hydrogen chloride, in which the respective end products each has a substantially high degree of freedom from the other product.

More specifically, I have provided an improved series of condensation and scrubbing steps for separating the liquefiable halogenated hydrocarbons from the normally gaseous hydrogen chloride associated therewith, by means of which a hydrogen chloride gas substantially free of halogenated hydrocarbons can be produced for subsequent conversion by absorption into hydrochloric acid.

Another object of my invention is to provide an improved contact tower for condensing and separating liquid benzene and chlorobenzene from normally gaseous hydrogen chloride and chlorine, in which accurate temperature control and conditions of scrubbing are provided for a maximum purity of end product.

Further objects and advantages of my invention will appear from the following description of a preferred form of embodiment thereof taken in connection with the attached drawing illustrative thereof and in which:

Fig. 1 is a central vertical section of my improved apparatus taken substantially along the line 1—1 of Fig. 2;

Fig. 2 is a partial vertical transverse cross section taken along the line 2—2 of Fig. 1.

In accordance with a preferred form of embodiment of my invention, I have shown in the drawing a composite treating tower 10, which is adapted to the specific separation of aromatic, halogenated hydrocarbons from hydrogen chloride-chlorine mixtures. More particularly, it is primarily arranged to separate a vapor mixture of benzene, chlorobenzene, chlorine and hydrogen chloride, which is introduced through feed pipe 12, into substantially pure liquid and gaseous end products.

As the first step in my separation process, I prefer to subcool the gases to partially condense the hydrocarbon portion, and I accomplish this operation by passing the gases over an internal tubular heat exchanger unit generally indicated at 14, into which a suitable refrigerant such as "Freon" may be introduced at 15 at removed at 16. It is possible in operating with "Freon" at —30° F. to obtain a temperature within the column of approximately 0° F., and most of the chlorobenzene and some of the benzene will be liquefied in this step.

The heat exchanger unit 14 is preferably of the form described in the copending application of Bertram and Fulton, Serial Number 436,888, filed March 30, 1942. In such construction external nozzles 18 are suitably welded to the exterior of the tower 10, and such nozzles serve to support the fixed tube sheet 19 and the cooling medium manifold 20 on one end and to support the floating tube sheet 21 and the floating tube sheet cover 22 at the other. On the floating end of the tube bundle 14 the nozzle 18 is closed by nozzle cover 23.

In this construction, the upper part of the heat exchanger is provided with a tray 25, which is perforated and serves to distribute any liquid over the entire surface of the tubes for the maximum heat exchange. A liquid collection tray 26 is also placed under the tubes, such tray, however, being imperforate but discharging over the end adjacent the floating tube sheet 21 and thus onto the decks 28 below.

The decks 28 are preferably of the shower tray type having a substantially central baffle or weir 28 to maintain a minimum height of liquid for the desired head on the perforated portion 30. The decks are conveniently staggered with respect to each other so that the shower section 30 of one deck overlies the imperforate portion of the deck below. In this manner there will be a continuous shower through which the vapors pass, it being noted that the materials that flow downwardly comprise normally liquefiable portions and normally gaseous portions.

The imperforate portion of the deck 28 may be used as a trap for the removal of a portion of the liquid as through the drawoff pipe 32 having the valve 33. It may be found desirable to remove the liquid, which is principally chlorobenzene and which may have some benzene contained therein. This liquid will serve to provide reflux for the bubble deck section 35, to be hereinafter described.

Alternatively, the entire mixture or vapors, gases and liquid may be passed over the second heat exchanger 36, which is similar to the first unit 14 in construction and is similarly provided with a refrigerating circuit with refrigerant introduced at 37 and discharged at 38. It is similarly possible to use a refrigerant such as "Freon," and it is possible to obtain a temperature below 0° F.

This second cooling step will condense the balance of the chlorobenzene and substantially all of the benzene and will make as substantial a separation as can be accomplished by temperature alone between the normally gaseous materials, such as the chlorine and the hydrogen chloride, on the one end and the normally liquid materials, such as the chlorobenzene and the benzene, on the other end. It is found, however, that there is some condensable material carried in the vapors which are collected in the chamber 39, which it is desirable to separate by further means. The liquids which collect on the partition 40 are conducted either by the downpipe 41 directly into the bubble deck section 35 or, alternatively, through the bypass pipe 42 into the lower portion 44 of the column.

The vapors are removed through the pipe 45, also into this lower chamber 44 but at a higher point, and such vapors will pass upwardly through the bubble trays 47 provided with bubble caps 48 for a further removal of the normally liquid materials from the normally gaseous materials. It is, of course, to be understood that either through the drawoff pipe 32 or through the downpipes 41 there is an adequate liquid level maintained on the respective decks 47 so that there will be an effective scrubbing action as the vapors pass to the outlet 54. The liquid is simultaneously and continuously removed through the outlet 52. Desirably, downpipe 49 from the lowermost bubble deck 47 is sealed as by means of pan 50.

It will be apparent that the temperature control of the materials passing downwardly through the column can be accurately adjusted to obtain the desired end products, it being arranged that some of the liquid can be bypassed across the second heat exchanger if desired and with a large volume of liquid it is possible to bypass the bubble deck section and to avoid any unnecessary holdup in the system. This will permit the same advantageous operation regardless of the variation in charge and the difference in percentages of the entering materials.

It is customary to operate the lower heat exchanger at a lower temperature than the upper one. Accurate control can be obtained by independent flow of refrigerant through the respective units.

It is also to be noted that the operation is completely self-sufficient in the formation of scrubbing liquid inasmuch as the initial cooling will provide the desired liquid level for such purpose. The unit is also conveniently made to include the four sections of cooling, shower decks, subcooling, and scrubbing. No other material need be added to the system, thereby avoiding any contamination or reaction.

While I have shown a preferred form of embodiment of my invention, I am aware that other modifications may be made thereto, and I, therefore, desire a broad interpretation of my invention within the scope and spirit of the description herein and of the claims appended hereinafter.

I claim:

1. The method of recovering a halogenated hydrocarbon from a halogen containing vapor mixture thereof, which consists in passing a stream of said mixture through a series of cooling zones to liquefy in each a portion of the mixture, withdrawing from said zones in separate streams the several liquefied portions of said mixtures, and subjecting the uncondensed effluent of the last cooling zone to the absorbing action of the liquid effluent from the adjacent and the non-adjacent cooling zones to absorb, dissolve or condense a further portion of the initial halogenated hydrocarbon.

2. The method of separating a vapor mixture including a halogenated aromatic hydrocarbon and a hydrogen halide, which comprises passing the vapor mixture through a subcooling zone to partially condense the halogenated hydrocarbon, separating the resulting condensate from the uncondensed vapors, passing the separated condensate in spray form in parallel contact with the uncondensed vapors to condense a further portion of the halogenated hydrocarbon, separating the resulting liquid from the remaining uncondensed vapors, and passing such liquid in countercurrent contact with the uncondensed vapors to condense and absorb remaining uncondensed halogenated hydrocarbon vapors.

3. The method as claimed in claim 2, wherein the halogenated aromatic hydrocarbon comprises a chlorobenzene and the hydrogen halide comprises hydrogen chloride.

4. The method of separating a vapor mixture including a chlorobenzene, benzene, and hydrogen chloride, which comprises passing the vapor mixture through a subcooling zone to partially condense the chlorobenzene and the benzene, separating the resulting condensate from the uncondensed vapors, passing the separated condensate in spray form in parallel contact with the uncondensed vapors to condense a further portion of the chlorobenzene and the benzene, separating the resulting liquid from the remaining uncondensed vapors, passing the uncondensed vapors through a second subcooling zone to substantially condense the remaining chlorobenzene and benzene, separating and removing the resulting condensate, and passing the uncondensed vapors in countercurrent contact with said liquid resulting from the parallel contact to condense and absorb remaining uncondensed chlorobenzene and benzene vapors.

5. The method as claimed in claim 4, which includes passing a portion of the second condensate together with the liquid resulting from the parallel contact in countercurrent contact with the uncondensed vapors.

6. The method of separating a vapor mixture including a chlorobenzene, benzene, and hydrogen chloride, which comprises passing the vapor mixture through a subcooling zone to partially condense the chlorobenzene and the benzene, separating the resulting condensate from the uncondensed vapors, passing the separated condensate in spray form in parallel contact with the uncondensed vapors to condense a further portion of the chlorobenzene and the benzene, passing the uncondensed vapors and the resulting liquid through a second subcooling zone to substantially condense the remaining chlorobenzene and benzene, separating the resulting condensate from the remaining uncondensed vapors, and passing such condensate in countercurrent contact with the uncondensed vapors to condense and absorb remaining uncondensed chlorobenezene and benzene vapors.

7. The method as claimed in claim 6, which includes separating a portion of the liquid resulting from the parallel contact and passing it directly to the countercurrent contact zone.

8. A scrubber of the type described including a subcooling zone, a series of shower decks in one section of the scrubber, and a series of bubble decks in another section of the scrubber, means to introduce a gaseous mixture into said subcooling zone, said gaseous mixture containing components which, on subcooling, form a liquid, means to introduce such liquid and the uncondensed gases above the shower deck section, said shower decks distributing said liquid in spray form in parallel contact with the uncondensed gases through a part of said scrubber, means to remove said liquid from the lower portion of the shower deck section and to introduce it above the bubble deck section, and means to remove the uncondensed gases from the lower portion of the shower deck section to a point below the bubble decks, said bubble decks forming the only path for the gases out of the scrubber, whereby they pass in countercurrent contact with the liquid and are freed of remaining condensable and absorbable liquid components.

9. A scrubber of the type described including a subcooling zone, a series of shower decks in one section of the scrubber, and a series of bubble decks in another section of the scrubber, means to introduce a gaseous mixture into said subcooling zone, said gaseous mixture containing components which, on subcooling, form a liquid, means to introduce such liquid and the uncondensed gases above the shower deck section, said shower decks distributing said liquid in spray form in parallel contact with the uncondensed gases through a part of said scrubber, means to remove said liquid from the lower portion of the shower deck section and to introduce it above the bubble deck section, a second subcooling zone between the shower deck section and the bubble deck section, said uncondensed gases passing through said second subcooling zone whereby a further portion thereof is liquefied, means to separate the resulting condensate from the uncondensed gas, means to remove the separated condensate from the scrubber, and means to remove the uncondensed gases to a point below the bubble decks, said bubble decks forming the only path for the gases out of the scrubber, whereby they pass in countercurrent contact with the liquid and are freed of remaining condensable and absorbable liquid components.

10. The scrubber as claimed in claim 9, which includes means to introduce a portion of the separated condensate above the bubble deck section.

11. A scrubber of the type described including a subcooling zone, a series of shower decks in one section of the scrubber, and a series of bubble decks in another section of the scrubber, means to introduce a gaseous mixture into said subcooling zone, said gaseous mixture containing components which, on subcooling, form a liquid, means to introduce such liquid and the uncondensed gases above the shower deck section, said shower decks distributing said liquid in spray form in parallel contact with the uncondensed gases through a part of said scrubber, a second subcooling zone between the shower deck section and the bubble deck section, the uncondensed gases and the liquid passing through said second subcooling zone to liquefy an additional portion of the gases, means to separate the resulting liquid from the uncondensed gases, means to pass the separated liquid downwardly through the bubble deck section, and means to remove the uncondensed gases to a point below the bubble decks, said bubble decks forming the only path for the gases out of the scrubber, whereby they pass in countercurrent contact with the liquid and are freed of remaining condensable and absorbable liquid components.

12. The scrubber as claimed in claim 11, which includes means to remove a portion of the liquid from the lower portion of the shower deck section and to directly introduce it above the bubble deck section.

AUSTIN S. BRUNJES.